US008267188B2

(12) United States Patent
Nicholson (10) Patent No.: US 8,267,188 B2
(45) Date of Patent: Sep. 18, 2012

(54) REMOTE CONFINED-SPACE MACHINING, AND POSITIONING AND SECURING ARRANGEMENT

(75) Inventor: Garth Martyn John Nicholson, Sheffield (GB)

(73) Assignee: The University of Sheffield, Sheffield, South Yorkshire (GB)

( * ) Notice: Subject to any disclaimer, the term of this patent is extended or adjusted under 35 U.S.C. 154(b) by 0 days.

(21) Appl. No.: 13/389,435

(22) PCT Filed: Aug. 9, 2010

(86) PCT No.: PCT/GB2010/051315
§ 371 (c)(1),
(2), (4) Date: Feb. 7, 2012

(87) PCT Pub. No.: WO2011/015886
PCT Pub. Date: Feb. 10, 2011

(65) Prior Publication Data
US 2012/0138323 A1 Jun. 7, 2012

(30) Foreign Application Priority Data
Aug. 7, 2009 (GB) .................................. 0913830.6

(51) Int. Cl.
*B23Q 5/04* (2006.01)
(52) U.S. Cl. .......... 173/32; 173/197; 173/213; 173/216; 408/97; 408/129; 409/231
(58) Field of Classification Search .................. 173/32, 173/213, 216, 147, 197, 145, 146; 408/129, 408/138, 97, 239 R; 409/231, 233; 310/12.14; 74/841
See application file for complete search history.

(56) References Cited

U.S. PATENT DOCUMENTS

| 3,885,635 | A | | 5/1975 | Menzel |
| 4,546,834 | A | * | 10/1985 | Menzel .......................... 173/146 |
| 4,607,180 | A | * | 8/1986 | Stoody ............................ 310/80 |
| 5,090,489 | A | * | 2/1992 | Ettori .............................. 173/165 |
| 5,100,271 | A | * | 3/1992 | Kameyama et al. .......... 409/231 |
| 5,195,853 | A | * | 3/1993 | Dooley .......................... 408/137 |

(Continued)

FOREIGN PATENT DOCUMENTS
CN 1037293 A 11/1989
(Continued)

OTHER PUBLICATIONS

Nicholson, Garth Martyn John and The University of Sheffield, International Search Report issued for International Patent Application No. PCT/GB2010/051315.

(Continued)

*Primary Examiner* — Scott A. Smith
(74) *Attorney, Agent, or Firm* — Jeffrey G. Sheldon; Sheldon Mak & Anderson (57) ABSTRACT

A machining tool comprises a frame mounting an extendable yoke slidable with respect to the frame in a first direction through one or more mounting pillars. A tool motor is mounted on the yoke. A drive mechanism for the yoke is also mounted in the frame, with a drive motor to drive the yoke drive mechanism. A belt is between pulleys on the drive motor and mechanism to transmit drive between them. A rotatable sleeve is around the tool motor and on which sleeve the belt engages on opposite sides of the tool motor, whereby the tool motor can extend between the drive motor and mechanism, thereby resulting in a compact arrangement of the tool.

29 Claims, 7 Drawing Sheets

U.S. PATENT DOCUMENTS

| | | | | |
|---|---|---|---|---|
| 5,350,263 | A | * | 9/1994 | Fedeli ............... 409/231 |
| 5,967,007 | A | * | 10/1999 | Scheer ............... 82/1.5 |
| 7,004,693 | B2 | * | 2/2006 | Adachi et al. ........ 409/144 |
| 7,547,169 | B1 | * | 6/2009 | Zagar et al. .......... 409/233 |
| 7,575,145 | B2 | * | 8/2009 | Nagao ................ 228/2.1 |
| 7,887,268 | B2 | * | 2/2011 | Mathis ............... 408/1 R |
| 2008/0232913 | A1 | | 9/2008 | Mathis |
| 2010/0303571 | A1 | | 12/2010 | Spath |

FOREIGN PATENT DOCUMENTS

| | | |
|---|---|---|
| DE | 19858669 A1 | 6/1999 |
| EP | 1992436 A1 | 11/2008 |
| GB | 2097197 A | 10/1982 |
| JP | 11129137 A | 5/1999 |
| WO | WO2006105951 A1 | 10/2006 |

OTHER PUBLICATIONS

Nicholson, Garth Martyn John and The University of Sheffield, Written Opinion of the International Searching Authority issued for International Patent Application No. PCT/GB2010/051315.

Nicholson, Garth Martyn John, Search Report issued for priority Great Britain Application No. GB0913830.6, Nov. 20, 2009.

* cited by examiner

REMOTE CONFINED-SPACE MACHINING, AND POSITIONING AND SECURING ARRANGEMENT

CROSS-REFERENCE TO RELATED APPLICATIONS

The present Application is a national stage of International Patent Application No. PCT/GB2010/051315, titled "Remote Confined-Space Machining, and Positioning and Securing Arrangement," filed Aug. 9, 2010, which claims priority from Great Britain Patent Application No. GB0913830.6, filed Aug. 7, 2009, the contents of which are incorporated in this disclosure by reference in their entirety.

This invention relates to a system for positioning and holding a machine for working in a confined space at a distance from a support base. It relates to means rendering the machine compact, but also secure in a correct position. In another aspect, it relates to mounting structure being an arrangement of a mechanism for permitting adjustment of the position of any device laterally with respect to a substrate to which the device is connected.

BACKGROUND

It is often required to machine a component somewhat remotely. This is becoming more common in advanced manufacturing, particularly in the aeronautic industries where the tendency is towards larger and larger monolithic components. Large monolithic components have fewer joints that can be a source of weakness. Nevertheless, while this may reduce the need for machining of components, it does not entirely remove it, and it may render what is needed somewhat more complex. Even multiple component parts often require machining in hard-to-reach places after their initial construction. Wing parts are a case in point.

However, robot arms are versatile and flexible and can carry machine tools into hard-to-reach places. Remote optics or other guidance can precisely position the end of a robot arm. There are several issues that need to be addressed. First of all, the tool at the end of a robot arm must be compact; first, to fit into any confined space, but secondly to be able to position a working tool bit of the tool in selected positions in the confined space. Next, although, ultimately, precise positioning is perfectly possible, it is difficult to move a remote arm, if it is long and flexible, without small movements being exaggerated at the tool head by the flexibility of the arm and the distance of the tool head from the stable base of the robot.

When machining components it is invariably necessary to provide a reaction member against which the tool performing the machining can react in response to loads imparted by the workpiece in reaction to the action of the machining tool. However, in hard-to-reach places, providing such reaction member is often problematic. One approach is to employ a rigid mounting for the machining tool, but in confined spaces, maneuvering such a member is a problem and may limit the position at which the tool can be located. However, employing a more slender mounting reduces the stiffness and reaction force that can be applied.

It is known to use the workpiece itself as a steady reaction base. By clamping the tool to the workpiece, it does not matter if the tool working bit moves uncontrolled with respect to the ground, provided it maintains a true relationship with the workpiece. However, such an arrangement requires a means of advancing the tool working bit into or against the workpiece, increasing the bulk and complexity of the tool head.

Furthermore, controlling the position of the tool working bit while any such clamp is activated is difficult. It involves predicting the position of the tool working bit once the clamp is effected; and that depends, to a large extent, on the nature of the workpiece, which inevitably varies from case to case. Connecting such a clamp to a workpiece in a confined space is another problem.

Regardless of the mounting arrangement and the requisite reaction member, the issue of traversing the machining tool relative to the workpiece and with respect to its mounting, in confined spaces, is problematic. It is desirable that the machine tool is not bulky, since this limits its maneuverability. Yet the function of precisely traversing the tool bit relative to the workpiece is often a fundamental requirement. For example, in drilling a hole in a workpiece, the drilling tool must:

provide a mounting to resist drill-skating during initial startup of the hole;

provide a reaction member to resist reaction forces primarily axially with respect to the rotation axis once drilling progresses provide means to advance the drilling bit as drilling progresses.

Consequently, it is an object of different aspects of the present invention, on the one hand to render a tool having tool bit advancement means as compact as possible, and, on the other hand, to provide means whereby accurate positioning of the tool working bit can be assured after clamping of the tool to a workpiece.

In another aspect, it is an object of the invention to provide a mounting structure for securely locating a device with respect to a substrate and to permit adjustment of part of the device with respect to the substrate, and subsequent locking of the device with respect to the substrate. While application of such a means to the machining of workpieces is clear from the first aspects of the present invention, the objective of the present aspect is not to be limited in that way.

BRIEF SUMMARY OF THE DISCLOSURE

In accordance with a first aspect of the present invention there is provided a machining tool comprising:

a frame mounting an extendable yoke slidable with respect to the frame in a first direction through at least one mounting pillar, a tool motor mounted on the yoke a drive mechanism for the yoke, which drive mechanism is mounted in the frame, a drive motor mounted in the frame to drive the yoke drive mechanism, a drive element between pulleys on the drive motor and mechanism to transmit said drive; and a rotatable sleeve around the tool motor and on which sleeve the drive element engages on opposite sides of the tool motor, whereby the tool motor can extend between the drive motor and mechanism, thereby resulting in a compact arrangement of the tool.

Thus the sleeve spaces the belt around the motor so that the two components can be disposed on either side of the tool motor. The tool motor is comparatively large in most applications, and most likely larger in diameter than the pulleys on the drive motor and mechanism between which the belt extends. Preferably, the tool motor has a substantially constant cross section. It need not contact the sleeve, although this will happen if the sleeve progresses towards one pulley, the tool motor then serving to retain the sleeve in position. However, this is very unlikely to happen where the diameter of the sleeve is much larger than the diameter of the pulleys, the belt then retaining the sleeve in a fixed position. The motor may have a circular cylindrical body and the sleeve may form a close sliding fit around the motor body. The sleeve therefore serves merely to spread the span of the gap between the belts so that the motor can fit between.

Obviously, if the pulleys are large enough that the gap between the belt is already sufficient to allow the motor to pass through, the tool will be dimensioned with at least three diameters of the motor. With the arrangement of the present invention, the maximum dimension can be limited to about two motor diameters. Here, the maximum dimension is, of course, referring to the dimension in the plane that is radial with respect to the tool motor axis. The dimension in the axial direction may well be larger.

Preferably, there are two pillars, one on either side of the motor. Preferably, the yoke is fixed to the pillars that slide in axially spaced bearing sleeves fixed in the frame. The frame preferably comprises two end plates, in which fore and aft ones of said bearing sleeves are arranged, one on each side of the tool motor. The end frames may be connected by limbs. Preferably, the drive mechanism and drive motor are fixed between said plates on either side of the tool motor, whereby two pillars form opposite side corners and the motor and mechanism form the other side corners of a substantially cuboid arrangement of the pillars, drive motor, drive mechanism and end plates.

Preferably, the drive mechanism comprises a lead screw. The lead screw may be rotationally journalled between said plates. A nut may be threadedly engaged with said lead screw and connected to said yoke to advance and retract the yoke with respect to the frame as the lead screw is rotated by said drive motor. The nut may be connected to the yoke by a rod that extends through the fore one of said end plates.

The tool may be a drill. The tool bit, in that case, is a drill bit preferably rotated on an axis parallel the tool motor axis. However, the yoke may include a gearbox that may change the speed of rotation in relation to the tool motor speed and/or displace the axis of rotation of the drill bit in relation to the tool motor axis, either so that it is to one side, but parallel the tool motor axis, or so that it is rotated so that it is inclined with respect to, for example perpendicular to, the motor tool axis.

The following preferable features may be provided:
the drive mechanism is on diametrically opposed sides of the tool motor;
there are two pillars, one on each side of the motor;
the machine tool is a drill, a drill bit being arranged to rotate about an axis parallel to the or each pillar;
a transfer box is disposed on the yoke to alter the drive from the tool motor to tool bit
the transfer box is a gear box to alter the speed and torque of the tool bit;
the transfer box is an offset drive to dislocate the axis of rotation of the tool bit from the axis of rotation of the tool motor;
the motor has a cylindrical body where it extends though said sleeve;
the body is circular cylindrical;
the or each pillar slides in bearings formed in the frame and is fixed to the yoke;
the or each pillar is fixed in the frame and slides in bearings formed in the yoke;
the drive mechanism is a lead screw mounted in the frame;
the drive element rotates the lead screw, which is rotationally mounted in the frame and drives a nut fixed in the yoke in which the lead screw is threaded;
the lead screw is fixed in the yoke, and the drive element rotates a nut, rotationally disposed, but axially fixed in the frame, and threaded on the lead screw;
the drive element is a belt
the sleeve is rotationally disposed, and axially fixed in the frame;
the motor does not touch the sleeve;
the drive motor and the tool motors rotate about parallel axes which are parallel the lead screw and the or each pillar.
the frame comprises two interconnected frame members between which said lead screw and the or each pillar extends.

In accordance with a second aspect of the present invention there is provided a machining tool comprising:
a frame mounting an extendable yoke slidable with respect to the frame in a first direction through at least one mounting pillar,
a tool motor mounted on the yoke and having a tool bit to machine a workpiece
a chassis plate connected to the frame beyond the yoke and through which the tool bit can protrude
a foot plate having attachment means for attaching to the workpiece, and
locking means to lock the chassis and foot plates together in selectable position within a plane containing said plates and inclined to said first direction,
whereby the tool can be fixed with respect to the workpiece for reaction against the workpiece during machining of the workpiece by the tool.

Preferably, said attachment means comprises a selectively actuable suction foot. Preferably, said locking means comprises a selectively actuable electromagnet on one of said chassis and foot plates that, when actuated, attracts a keeper on the other of said chassis and foot plates, clamping said plates together. Said keeper may comprise a ferromagnetic washer around a leg connecting said chassis plate to the frame, the leg extending through an aperture of the foot plate that permits lateral movement of the foot plate with respect to the chassis plate when said electromagnet is not actuated. Said keeper may be spring biased against said foot plate to press said chassis and foot plates together so that they slide against one another when one is moved with respect to the other in a direction parallel said plane that contains them.

Preferably, said plates are non-ferromagnetic. Preferably, the tool is a drill. Indeed, preferably, the tool according to the second aspect of the present invention is also a tool having one or more features of a tool according the first aspect, and vice versa.

Preferably, in either aspect of the present invention, the frame has means enabling connection to a robot arm. Thus, in use, a robot arm mounting the tool is capable of being manipulated into numerous hard-to-reach locations, according to the flexibility of the robot arm and the compactness of the tool. According to the first aspect of the present invention, the tool is rendered comparatively compact so that smaller spaces can be accessed by the tool on the end of the robot arm. In the case of the second aspect, the arrangement permits a robot arm to position approximately the tool with respect to the workpiece using any positioning system as may be provided. For example, the workpiece may be transparent or not entirely enclosed, enabling direction observation of the position of the tool. Alternatively, a camera, and a light, may be mounted on the tool, enabling observation remotely. In any event, the tool is positioned approximately in the correct location for the machining operation to be effected. Then, the attachment means are actuated and the tool, or at least the foot plate, is firmly connected to the workpiece. The workpiece will itself be connected to ground, as is the base of the robot arm. Finally, any required fine adjustment of the position of the tool with respect to the work piece can be made without the flexibility of the arm accentuating any intended movement, given the attachment of the foot to the workpiece. Once the correct position is achieved, the locking means are also actuated and machining can begin.

Preferred features include:
- the tool is one according to the first aspect of the present invention;
- the locking means comprises at least one of the plates being ferromagnetic and disposing electromagnets on the remote side of the other plate, whereby the two plates are capable of being locked together when the magnets are energized;
- the electromagnets are gradually energisable to provide resistance and damping of relevant movement between the plates;
- another form of damping between the plates is provided;
- the plates are planar, and slide over one another;
- the plate plane is arranged to be parallel the substrate when the attachment means connect the tool to the substrate;
- the attachment means comprise a vacuum system;
- columns connect the frame to the chassis plate, the columns passing through windows of the foot plate which is disposed between the chassis plate and frame;
- at least a tool bit of the machine tool extends through overlapping apertures in the chassis and foot plates.

Preferably, either of the machine tools defined above have some or all of:
- a camera associated therewith, whereby a substrate to be machined may be viewed remotely;
- the association being remote through the agency of an optic link terminating at the tool;
- the optic link comprises an optic fibre;
- lubrication dispensing means, to lubricate the tool in operation;
- chip extraction means to collect chippings and swarf generated by the machining operation.

Thus when both aspects of the present invention are employed, a tool, especially a drill, can be provided with a compact structure for disposition on the end of a robotic arm that is insufficiently rigid to constitute a reaction member for the tool, but is sufficiently flexible and slender to penetrate hard-to-reach places. The tool is sufficiently compact that it hardly constitutes a limiting factor in the size of the space in which it can be disposed. Once approximately positioned the attachment means can be activated to connect the tool to the workpiece. Fine control of the position of the tool bit can be effected by first releasing the locking means and then adjusting the position of the remaining components relative to the workpiece while the foot plate is connected to the workpiece. Especially if damping between the chassis and foot plates is provided, jerky movements, or what might become jerky movements of the tool at the end of a long robot arm, can be accommodated and the locking means energized to stop relative movement between the plates when the tool is positioned precisely. The camera assists in this task.

Potentially, there are a number of cables and conduits that need to be connected to the tool, and run down a robotic arm:
- a cable to carry power and command signals to the tool and drive motors;
- an optic fibre or cable for power and command of the camera if that is mounted on the machine tool;
- a cable for powering illumination at the tool;
- a conduit carrying lubrication and cooling fluid; and
- a conduit for extraction of swarf and used lubrication.

In accordance with a third aspect of the present invention there is provided a mounting structure comprising an annular plate having an aperture and a foot plate fixed and sealed together at their external peripheries, and a base plate received between them and sealed to each plate around its periphery, thereby to define an annular chamber between the annular and foot plates in which a rheological fluid is disposed, the base plate being connectible to a first device through the aperture of the annular plate and the foot plate being connectible to a second device, which first and second devices are to be positioned with respect to one another and adjustable in position with respect to one another in a surface parallel the surface of interaction between the annular, foot and base plates, wherein activation of said rheological fluid to render it solid serves to lock the devices with respect to one another, while deactivation of the rheological fluid to render it liquid serves to permit the position of the devices to be adjusted with respect to one another by sliding the base plate between the annular and foot plates in said surface of interaction.

Preferably, said surface of interaction is planar. However, it may be spherical. Indeed, it may be cylindrical, or even conical, but this limits the adjustment possible to just one, or possibly two directions, that is, circumferential with respect to cylindrical or conical interaction surfaces, or axially also in the case of cylindrical surfaces. Preferably, when the rheological fluid is not activated, the base plate has an infinite number of degrees of freedom of movement within the interaction surface and with respect to the annular chamber.

Preferably the rheological fluid is magnetorheological, whereby generation of a magnetic field adjacent the annular chamber solidifies the fluid. Alternatively, the rheological fluid is electrorheological, whereby generation of an electric field adjacent the annular chamber solidifies the fluid.

BRIEF DESCRIPTION OF THE DRAWINGS

Embodiments of the different aspects of the present invention are further described hereinafter with reference to the accompanying drawings, in which.

DETAILED DESCRIPTION

Figure 1:
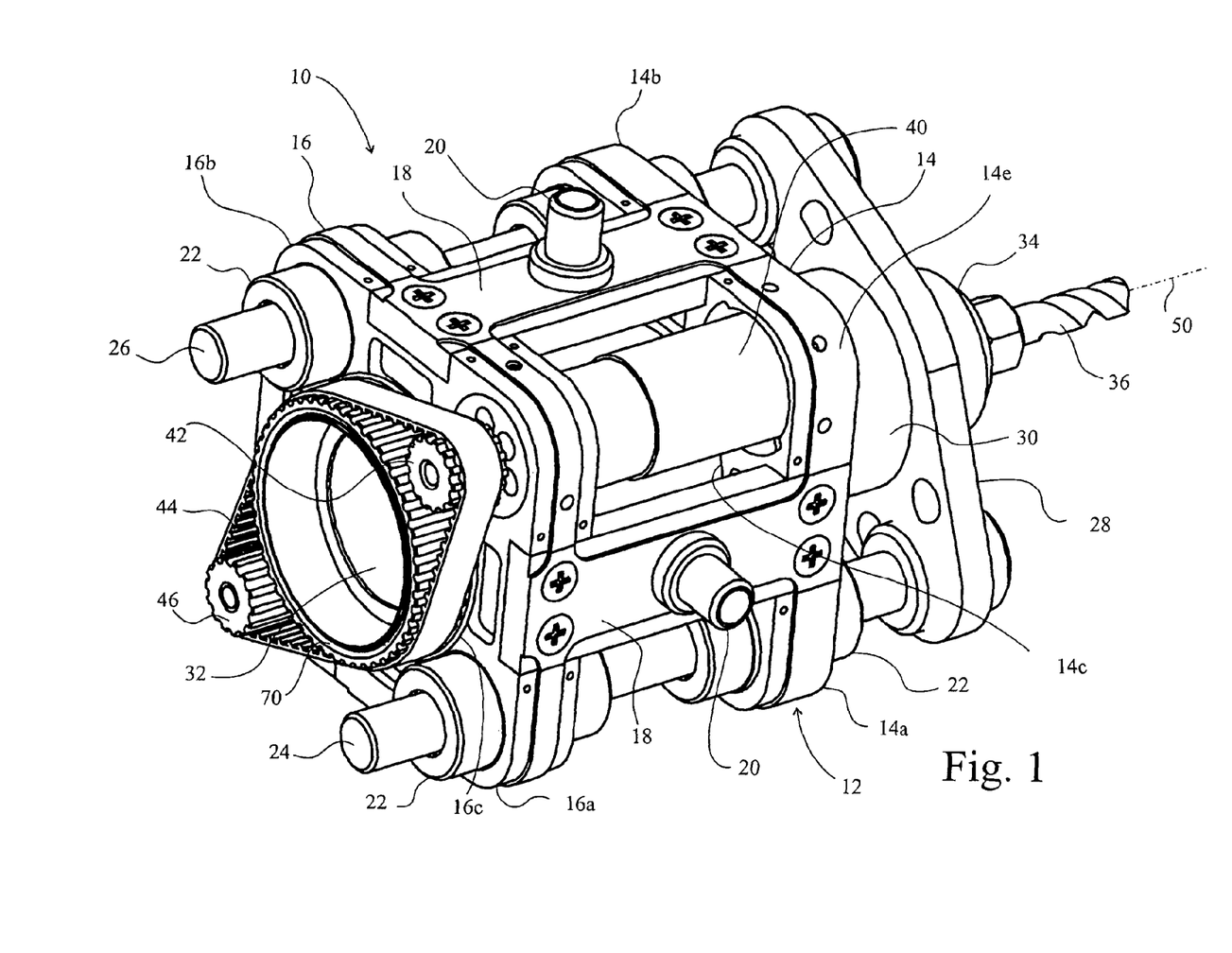
FIG. 1 is a perspective rear view of a drilling tool in accordance with the first aspect of the present invention.

A drilling tool 10 comprises a frame 12 that has a fore plate 14 and an aft plate 16 connected together by limbs 18. The plates 14,16 are rounded squares, so that there are four limbs 18. At least one of the limbs incorporates a mounting flange 20 for connection to a robot arm (not shown).

Opposing corners 14a,b of the fore plate 14 and 16a,b of the aft plate 16 incorporate sleeve bearings 22 through which a pair of pillars 24,26 slide. The pillars 24,26 are fixed on a yoke 28 on which is also mounted a tool motor 30. The tool motor 30 has a body 32 that is substantially cylindrical and drives an armature (not shown) about a longitudinal axis 50 of the tool 10. A chuck 34 receives a drill bit 36 to be driven by the motor 30 for drilling holes in a workpiece (not shown).

In drilling holes, it is of course necessary to advance the drill bit 36 in the direction of the hole it is drilling, which is in the direction of axis 50 in FIG. 1. It is of course feasible that a robot arm holding the tool 10 can be advanced precisely in the direction of the axis 50 and providing sufficient reaction force to resist the loads imposed on the tool 10 by the drilling action of the tool bit 36. However, when the robot arm is long and potentially extends through one or more angles, not only might the stability required for precise drilling be lost, but the problem of advancing along the line of the axis 50 may be insurmountable. Accordingly, the tool 10 is provided with an advancement mechanism that comprises a drive motor 40 disposed between the plates 14, 16. The motor 40 drives a pulley 42 around which is provided a belt 44. The belt 44 drives a further pulley 46 that rotates a lead screw 48 journalled in bearings 52,54 in the aft and fore plates 16, 14 respectively. A nut 56 is threaded (see FIG. 2) on the lead screw 48 and is fixed to a pair of drive rods 58. The drive rods slide through sleeve bearings 60 in the fore and aft plates 14, 16 and are fixed to the yoke 28.

Figure 2:
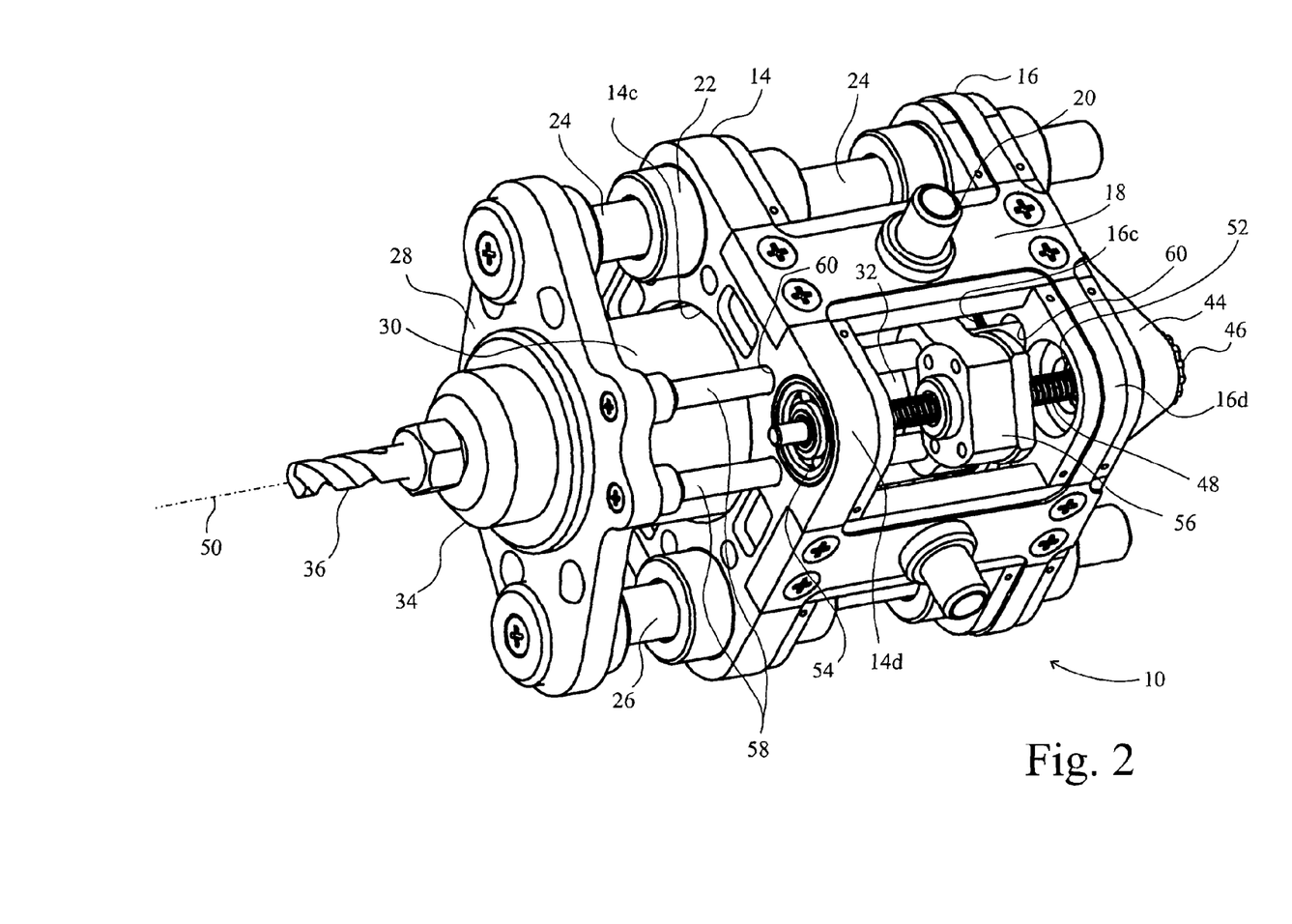
FIG. 2 is a perspective front view of the tool of FIG. 1.

The plates 14,16 have central apertures 14c,16c respectively through which the motor 30 extends. In order to provide room for the end 32 of the motor 30 to extend between the pulleys 42,46, a sleeve 70 is provided around which opposite sides of the belt 44 engage. The internal diameter of the sleeve 70 is approximately the same as the internal diameters of the apertures 14c,16c and sufficient to accommodate the motor 30 without contact. However, some rubbing of the sleeve on the motor is not problematic. When the drive motor 40 rotates, the lead screw 48 screws itself into the nut 56 advancing it in the direction of the lead screw 48, which is arranged parallel to the axis 50. The rods 58 are likewise parallel the axis 50 and cause the yoke 28 to advance in that direction, the pillars 24,26 sliding in the bearings 22. The arrangement is such that the lead screw 48 and nut 56, and the drive motor 40, are disposed at the other opposing corners 14d,16d and 14e,16e of the fore and aft plates 14,16 respectively. By virtue of the sleeve 70 permitting this arrangement, a particularly compact tool 10 results.

Figure 3:
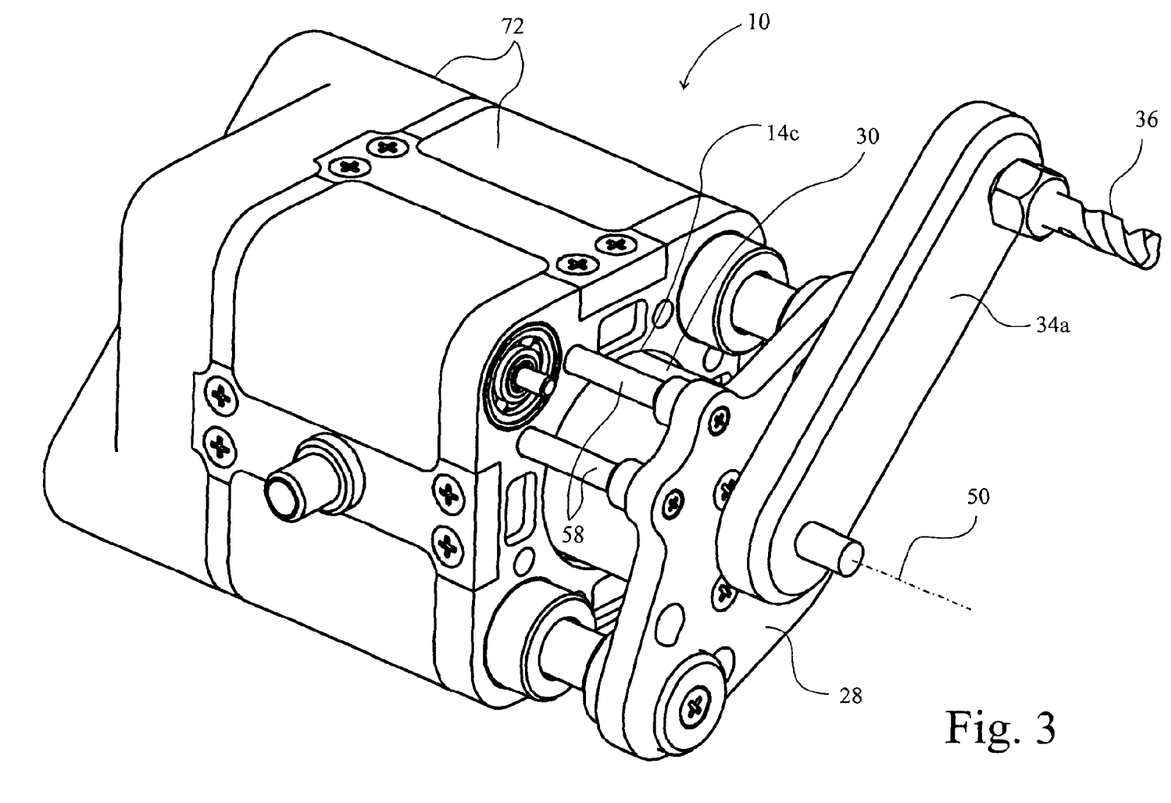
FIG. 3 is a front perspective view of a modified tool of the type shown in FIG. 1.

In FIGS. 1 and 2, the drill bit 36 and chuck 34 are concentric with the axis 50. Turning to FIG. 3, the chuck 34 has been replaced by a transfer box 34a that serves to displace the axis of the drill bit 36 offset from the axis 50. This may be achieved by a belt and pulley arrangement, or appropriate gearing. Indeed, the arrangement can be to step up, or down, the speed of rotation of the drill bit 36. However, the primary purpose is to enable the drill bit 36 to work in particularly tight corners where the bulk of the tool 10 might interfere, despite its compact arrangement. FIG. 3 also shows the tool with housing parts 72 that cover the internal components of the tool and help to protect them from swarf and cuttings that may be generated. Indeed, the arrangement might even be sealed, to exclude liquid, in the event that a lubricant for the drilling is employed externally. In this event, the aperture 14c may be sealed around the motor body 30 as the latter slides through the aperture on actuation of the yoke 28.

Figure 4:
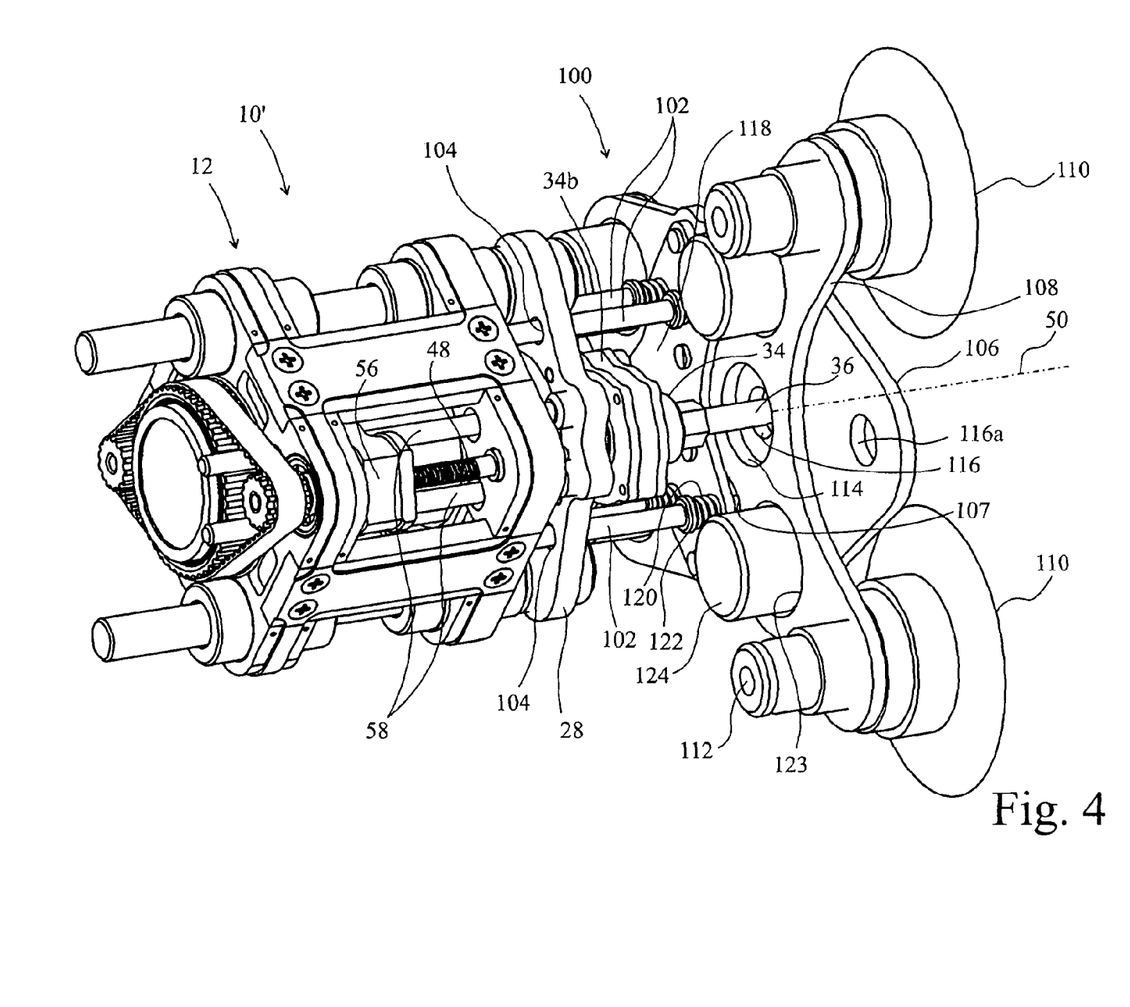
FIG. 4 shows a rear perspective view of a tool incorporating the features of the first aspect of the present invention, but also incorporating features of the second aspect of the present invention.

Turning to FIG. 4, the tool 10' illustrated therein is supplemented by an attachment mechanism 100, according to the second aspect of the present invention. Here, columns 102 are fixed to the frame 12, passing through apertures 104 in the yoke 28. The other ends of the columns 102 are fixed to a base plate 106, passing through apertures 107 in a foot plate 108. The foot plate 108 is provided with a number of suction pads 110, selectively supplied with a vacuum source (not shown) to ports 112 and by means of which the pads 110 may be applied to and held in contact with a substrate or workpiece (not shown).

The foot plate 108 is provided with a recess 114 to allow passage of the drill bit 36 without interference thereof. The drill bit also passes through a small aperture 116 in the base plate 106, which aperture that is sized to accommodate the largest drill bit 36 that might be employed by the tool 10'. The base and foot plates 106, 108 are planar and are disposed perpendicularly with respect to the axis 50 of the drill bit 36. Washer plate 118 is slidably disposed on the columns 102 and may be pressed into engagement against the back of the foot plate 108 by springs 120 disposed on the columns 102 and held in place by grip rings 122. Thus, the plates 106, 108 are urged together by the washer plate 118 but only so as to permit them to slide against one another in their plane, perpendicular to the axis 50.

The base plate 106 is ferromagnetic, or has ferromagnetic elements of it, whereas the foot plate 108 is not. The foot plate 108 mounts in apertures 123 a plurality of electromagnets 124. When these are energised, the base plate and foot plate are firmly clamped together by attraction of the base plate 108 by the magnets 124. Thus, in use, the tool 10' is offered up to the workpiece with the base and foot plates in a central juxtaposition with respect to one another, the magnets 124 being energised so that no relative movement between the two plates is possible. When the tool 110 is positioned against the substrate, with the suction feet 110 resting against a planar surface of the workpiece and in the approximate position where it is desired to drill a hole, the suction feet 110 are activated. The foot plate 108, therefore, becomes fixed with respect to the workpiece. However, by virtue of the potential inaccuracies of the positioning system, the exact position of the drill bit 36 with respect to the workpiece may not precisely be where it is wanted. An optical positioning system (not shown) might verify this. In this event, the electromagnets 124 are de-energised, but without releasing the foot plate 108 and suction pads 110. Now, within the confines of the recess 114 and the apertures 107 in the foot plate 108, the position of the tool 10' can be adjusted laterally, that is to say radially, with respect to the axis 50. As mentioned above, the springs 120 maintain the parallel disposition of the base and foot plates 106,108, so that, even when the magnets are de-energised, they only slide with respect to one another. In fact, it may be found that the springs 120 are unnecessary and that all that is needed is a nut (not shown, but of the locking type, for example with a nylon thread) which is screwed onto a thread (not shown) on the columns 102. The nut can then press washer plate 118 towards base plate 106 sufficiently to restrain movement of the footplate 108 between them to a sliding movement only over the base plate 106.

Assuming that an accurate positioning system is available (not shown), the precise location of the drilling bit 36 can be assured, whereupon the electromagnets 124 are re-energised to fix the position. Thereafter, the motor 30 can be started to commence drilling, and the drive mechanism 40,56 invoked to advance the drill bit 36 into the workpiece. The mounting arrangement 100 provides reaction for the tool against the loads imposed by the drilling operation.

Figure 5:
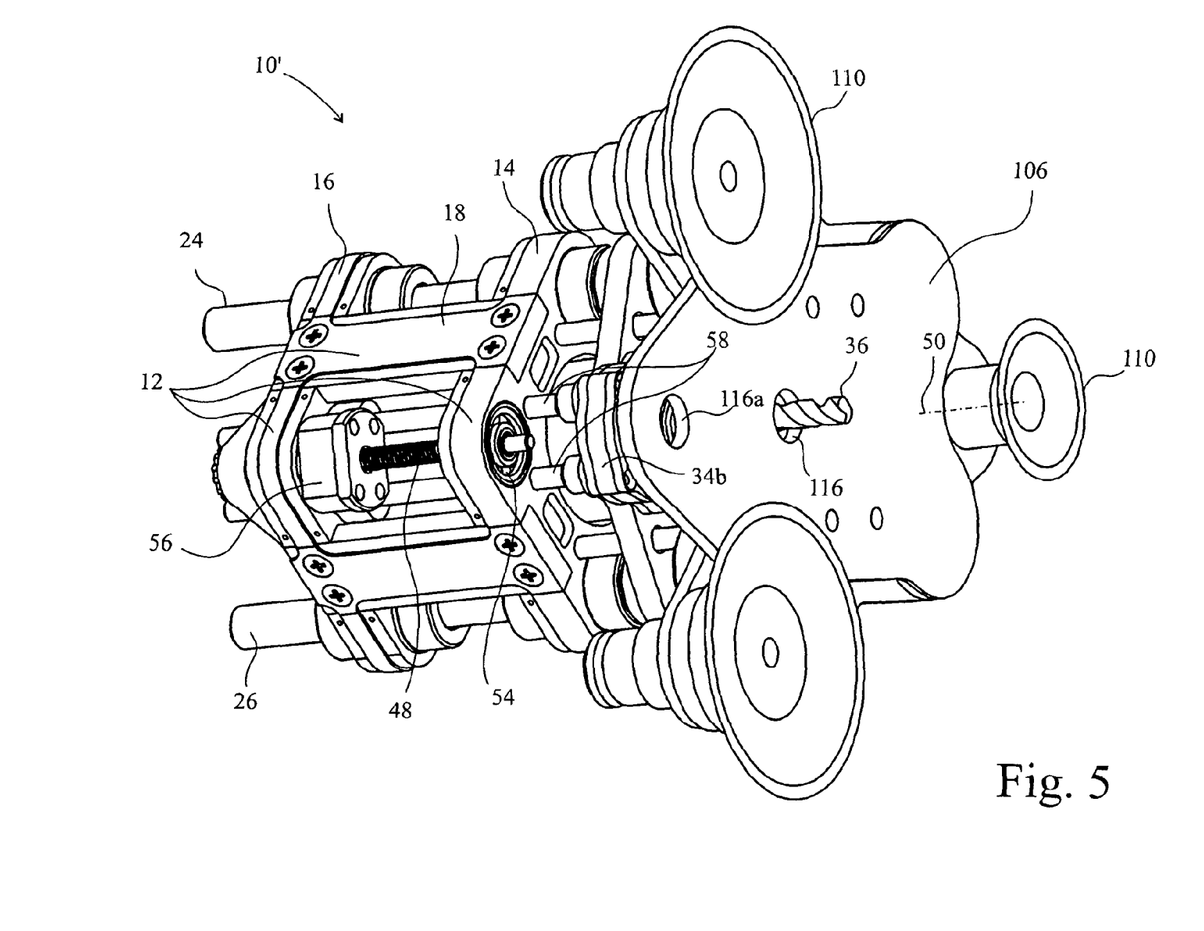
FIG. 5 is a front perspective view of the arrangement shown in FIG. 4.

It is to be noted that a gearbox 34b is disposed between the drill chuck 34 and yoke 28. Moreover, with the drill bit 36 extending through the mounting system 100, it can be long. Consequently, it is preferred that a drill bush (not shown) is mounted on the underside of base plate 106 (ie that visible in FIG. 5), around the aperture 116 to support laterally the drill bit. Also, the gearbox 34b may, like the transfer box 34a as described above, change or not the speed of operation of the drill. However, its primary purpose in the present embodiment disclosed in FIGS. 4 and 5 is to displace the axis of drill bit 36 laterally with respect to the motor axis 50 and render it in the plane containing the drive rods 58 and halfway between them. It is the drive rods, of course, that drive the yoke 28 through the action of the lead screw and nut 48,56. Consequently, by aligning the drill axis with the drive rods 58 there is no resultant moment that might cause misdirection of the drill. It is also to be noted in FIGS. 4 and 5 a further aperture 116a in the plate 106. This would enable an offset gearbox 34a (FIG. 3) to be employed.

The positioning system mentioned above and other support systems are not part of the present invention, but only subsidiary to it. If the tool is intended to be employed in enclosed spaces at the end of a robot arm, as presently proposed, then it is likely that a camera will be employed to enable accurate positioning of the tool with respect to the workpiece. The camera (not shown) may be mounted directly on the tool, but equally, it may be mounted remotely, with an optic fibre link or other transmission arrangement supplying an image of the workpiece to the camera. A camera also presupposes a source of light to illuminate the workpiece, and this likewise may be remote and the light transmitted by optic fibre or the like. Alternatively, a; light source may be mounted on the tool. Several electrical links to the tool are needed, to power the main drive motor 30, as well as the advancement motor 40, as well as any additional control arrangements. Various conduits may be provided, one to supply cooling and lubricating medium to the drill bit, and another to collect used medium, as well as cuttings swarf from the drilling operation. While drilling is described, other machining operations are feasible.

Figure 6:
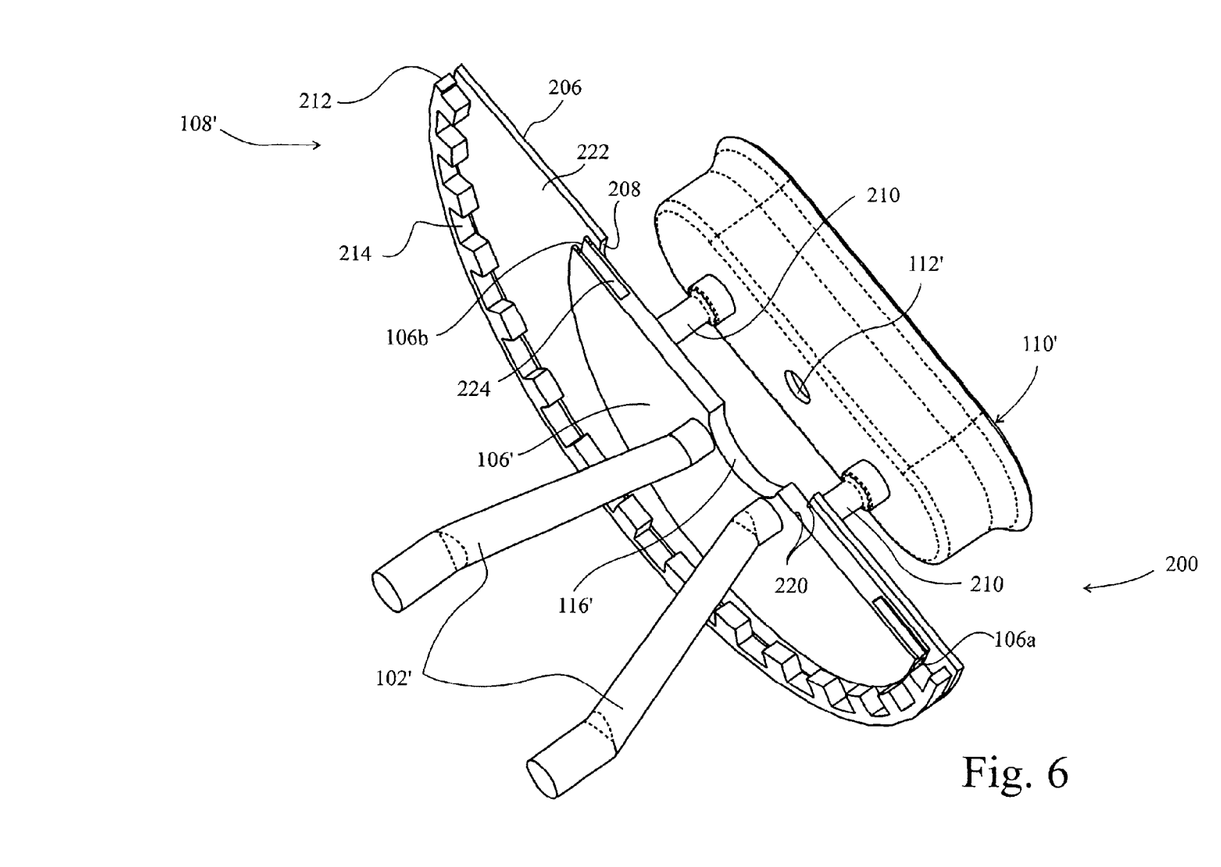
FIG. 6 is a rear perspective, partly sectional view of a mounting structure in accordance with the third aspect of the present invention, (with its annular plate invisible)
Figure 7:
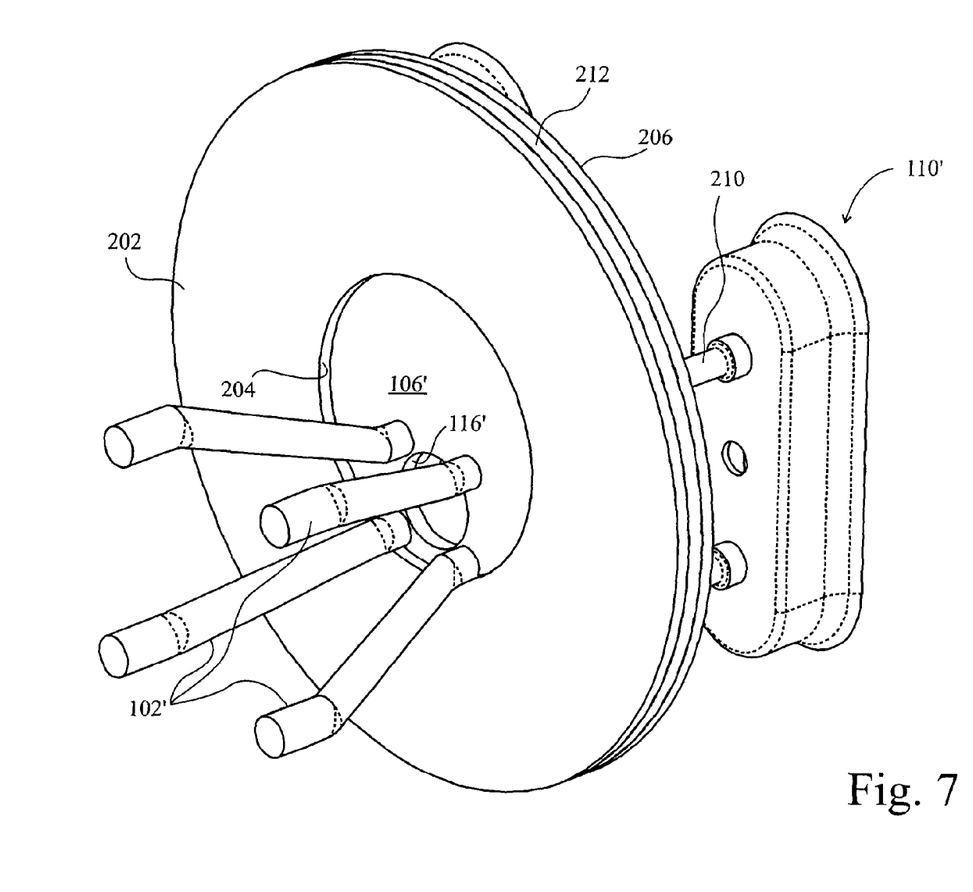
FIG. 7 is a rear perspective view of the structure shown in FIG. 6.

In FIGS. 6 and 7 is illustrated a support structure 200 that can take the place of the support structure 100 described above with reference to FIGS. 4 and 5. Here, a base plate 106' has columns 102' fixed thereto. A composite foot plate 108' comprises an annular plate 202 (invisible in FIG. 6) having an aperture 204 through which the columns 102' pass, and a foot plate 206 which is also annular having a central aperture 208. The necessity for the aperture 208 depends upon the application. For a drilling base, as described above, it is necessary to allow passage of the drill bit. However, for other applications this aperture 208 might not be required. Foot attachment means 110' are fixed to the foot plate 206 by rods 210. The attachment means 110' may comprise a suction arrangement, provided with a suction port 112', similar to the embodiment described above with reference to FIGS. 4 and 5. The annular and foot plates 202,206 are fixed together by a rim element 212 that is provided with internal castellations 214 described further below. The base plate 106' is received between the annular plate 202 and foot plate 206 and is sized so that, when one edge 106a touches the castellations of the rim 212, the opposite edge 106b is still between the plates 202, 206. Around each internal periphery of the apertures 204, 208 the annular plate 202 and the foot plate 206 are each provided with an annular O-ring seal 220. Thus, between the annular plates 202, 206, the rim 212 and the base plate 106' an annular (or sickle shaped) chamber 222 is defined. The chamber 222 is filled with a rheological fluid, which may be magnetorheological or electrorheological. When the rheological fluid is liquid, the base plate 106' is a close sliding fit between the plates 202,206 and it can slide between them to any position within the confines permitted by the rim 212 and plate 106', and the columns 102' in the aperture 204. However, when the rheological fluid is activated, either by a magnetic field or an electrical field, as the case may be, the fluid in the chamber 222 turns solid and locks the base plate 106' in position with respect to the composite foot plate 108'. When activated, the rheological fluid keys with the castellations 214. Corresponding castellations may be provided on the external periphery 106b of the base plate 106'. However, ferrous elements or tongues or slots 224 may be provided in the edge 106b to interact with the rheological fluid.

Indeed, while the arrangement has an evident application in the field of machining and drilling, as described above with reference to FIGS. 1 to 5, the mounting structure 200 may have broader application. In that event, the rheological fluid may not merely be employed for locking the base plate 106' with respect to the foot plate 108', but may also be employed to selectively damp relative movements between them in the plane that contains them. To this end, there is no limitation of the devices that can be attached to each plate. For drilling purposes, not only is the aperture 208 provided in the foot plate 206 to allow access of the drill bit 36, but also a hole 116' is required for the same purpose.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A machining tool comprising:
 a) a frame mounted on an extendable yoke, wherein the yoke slides with respect to the frame in a first direction along at least one mounting pillar;
 b) a tool motor mounted on the yoke;
 c) a yoke drive mechanism mounted in the frame;
 d) a drive motor mounted in the frame to drive the yoke drive mechanism, the drive motor comprising one or more pulleys;
 e) a drive element located between the one or more pulleys and yoke drive mechanism; and
 f) a rotatable sleeve adapted to fit around the tool motor, wherein the drive element engages the sleeve on opposite sides of the tool motor, the tool motor extending between the drive motor and yoke drive mechanism.

2. The machining tool of claim 1, wherein the tool motor comprises a substantially constant longitudinal cross section.

3. The machining tool of claim 1, wherein the tool motor comprises a cylindrical body.

4. The machining tool of claim 1, wherein the sleeve forms a close sliding fit around the cylindrical body.

5. The machining tool of claim 1, further comprising two mounting pillars, each mounting pillar located on either side of the tool motor.

6. The machining tool of claim 5, wherein the yoke is fixed to the mounting pillars, each mounting pillar sliding along one or more axially-spaced sleeves fixed in the frame.

7. The machining tool of claim 1, wherein the frame comprises a fore end plate and an aft end plate, the fore end plate comprising one or more bearing sleeves, the aft end plate comprising one or more bearing sleeves, the fore end plate and aft end plate being arranged such that there is one on each side of the tool motor.

8. The machining tool of claim 7, wherein the fore plate and aft plate are connected by limbs.

9. A machining tool comprising:
  a) a frame comprising a fore end plate and an aft end plate connected by limbs, the frame mounted on an extendable yoke, wherein the yoke slides with respect to the frame in a first direction along two mounting pillars;
  b) a tool motor mounted on the yoke with each mounting pillar located on either side of the tool motor, the tool motor comprising a cylindrical body having a substantially constant longitudinal cross section;
  c) a yoke drive mechanism mounted in the frame;
  d) a drive motor mounted in the frame to drive the yoke drive mechanism, the drive motor comprising one or more pulleys, wherein the yoke drive mechanism and drive motor are fixed between the fore end plate and aft end plate on either side of the tool motor, whereby the two mounting pillars form opposite side corners and the drive motor and yoke drive mechanism form the other side corners of a substantially cube-shaped arrangement of the mounting pillars, the drive motor, the yoke drive mechanism, the fore end plate, and the aft end plate;
  e) a drive element located between the one or more pulleys and yoke drive mechanism; and
  f) a rotatable sleeve forming a close sliding fit around the cylindrical body of the tool motor, wherein the drive element engages the sleeve on opposite sides of the tool motor, the tool motor extending between the drive motor and yoke drive mechanism.

10. The machining tool of claim 9, wherein the yoke drive mechanism comprises a lead screw rotationally journalled between the fore end plate and the aft end plate, a nut being threadedly engaged with the lead screw and connected to the yoke to advance and retract the yoke with respect to the frame as the lead screw is rotated by the drive motor.

11. The machining tool of claim 10, wherein the nut is connected to the yoke by a rod that extends through the fore end plate.

12. The machining tool of claim 10, wherein the lead screw is fixed in the yoke and the drive motor rotates the nut, wherein the nut is rotationally disposed and axially fixed in the frame and threaded on the lead screw.

13. The machining tool of claim 10, wherein the drive motor and the tool motor rotate about parallel axes which are parallel to the lead screw and the one or more mounting pillars.

14. The machining tool of claim 9, wherein the tool motor has an axis that is parallel to each mounting pillar.

15. The machining tool of claim 9, wherein the yoke further comprises a transfer box.

16. The machining tool of claim 9, in which the drive element is a belt.

17. The machining tool of claim 9, wherein the sleeve is rotationally disposed, and axially fixed in the frame.

18. The machining tool of claim 9, wherein the tool motor does not touch the sleeve.

19. The machining tool of claim 1 or 9, wherein the frame comprises connection means for connecting to a robot arm.

20. The machining tool of claim 1 or 9, further comprising a camera.

21. The machining tool of claim 20, wherein the camera is connected using an optic fibre.

22. The machining tool of claim 1 or 9, further comprising lubrication dispensing means.

23. The machining tool of claim 1 or 9, further comprising chip extraction means to collect chippings and swarf generated by the machining.

24. The machining tool of claim 1 or 9, wherein the machining tool comprises a drill, the drill comprising a drill bit.

25. The machining tool of claim 24, wherein the drill bit is rotated on an axis parallel to the axis of the tool motor.

26. The machining tool of claim 24, wherein the yoke further comprises a transfer box, wherein the transfer box changes the speed of rotation of the drill bit in relation to the tool motor speed.

27. The machining tool of claim 24, wherein the yoke further comprises a transfer box, wherein the transfer box displaces the axis of rotation of the drill bit in relation to the axis of the tool motor so that the drill bit is to one side of the tool motor, but also parallel to the axis of the tool motor.

28. The machining tool of claim 24, wherein the yoke further comprises a transfer box, wherein the transfer box displaces the axis of rotation of the drill bit in relation to the axis of the tool motor so that the drill bit is inclined with respect to the axis of the tool motor.

29. The machining tool of claim 28, wherein the transfer box displaces the axis of rotation of the drill bit in relation to the axis of the tool motor so that the drill bit is inclined perpendicular with respect to the axis of the tool motor.

* * * * *